Sept. 8, 1925.
J. SWANEY
1,553,052
ANTITHEFT MILK BOTTLE HOLDER
Filed Dec. 27, 1923
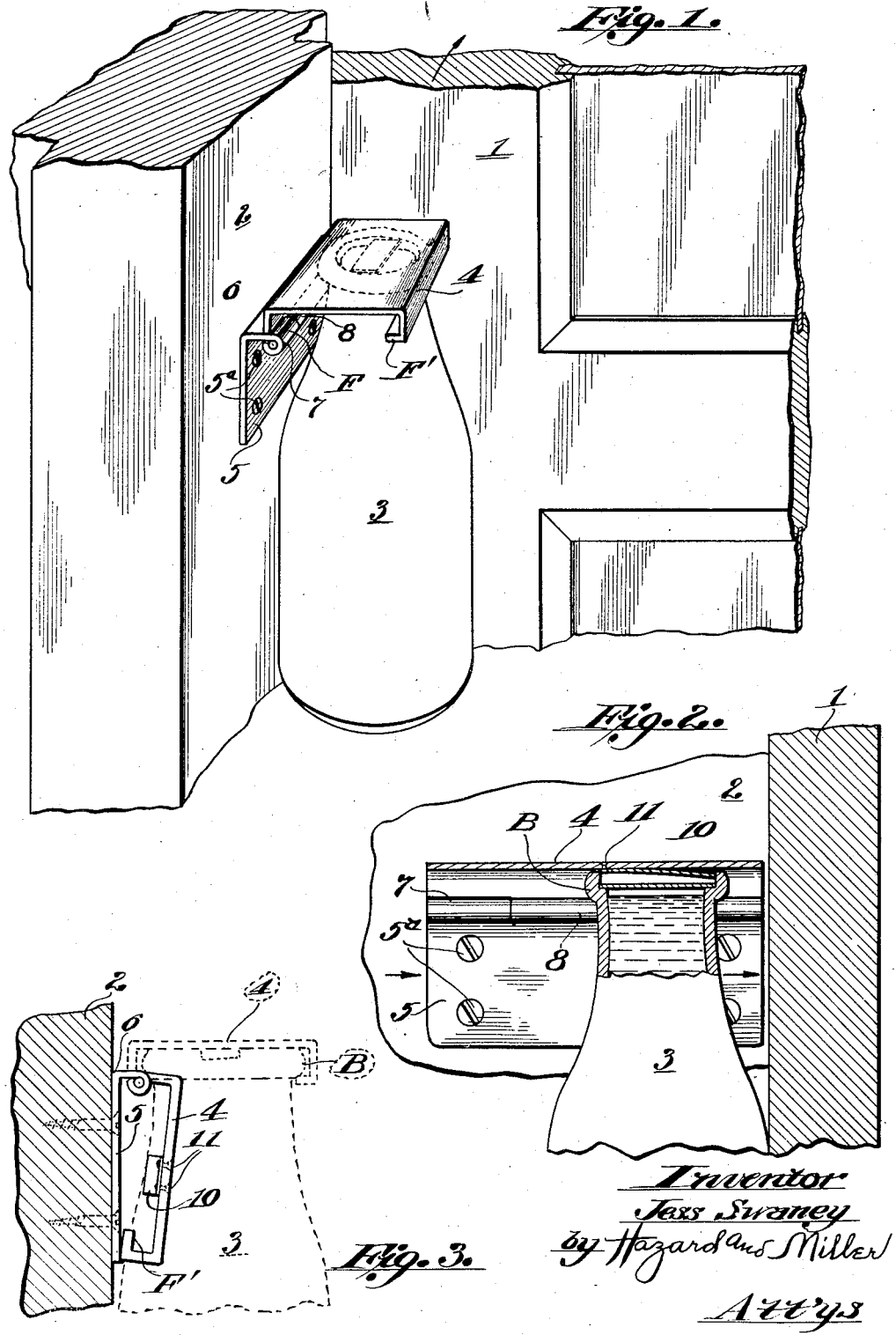

Patented Sept. 8, 1925.

1,553,052

UNITED STATES PATENT OFFICE.

JESS SWANEY, OF WILMINGTON, CALIFORNIA.

ANTITHEFT MILK-BOTTLE HOLDER.

Application filed December 27, 1923. Serial No. 682,883.

*To all whom it may concern:*

Be it known that I, JESS SWANEY, a citizen of the United States, residing at Wilmington, in the county of Los Angeles and State of California, have invented new and useful Improvements in Antitheft Milk-Bottle Holders, of which the following is a specification.

My present invention being referred to as an antitheft milk bottle holder, it may be understood to be an object of this invention to provide means for the secure retention of a milk bottle, pending the removal of the same by a householder or other authorized person.

It is an object of this invention to provide a milk bottle holder which shall serve to retain a milk bottle in proximity to a door, window or the like, upon the opening of which a bottle of milk or the like may be freely removed inwardly, although my preferred construction is such as to prevent the outward or unauthorized withdrawal of a bottle of milk.

A further object of this invention is to provide a milk bottle holder adapted to be secured to a door or window jamb or the like, and preferably pivoted in such manner as to permit it to swing into an inoperative position, although capable of being easily moved into an operative position in which it may serve not only to prevent the theft of a bottle of milk but also completely to cover the top thereof, in a manner preventing contamination, as by prowling cats or dogs.

Other objects of my invention will appear from the following description of the preferred embodiment thereof, taken in connection with the appended claims and the accompanying drawing, in which, Fig. 1 is a perspective view showing one advantageous embodiment of my novel milk bottle holder, as the same may be secured to a jamb and in proximity to an inwardly opening door or window;

Fig. 2 is an elevational view showing the top of a milk bottle within my novel holder, parts being shown in section;

Fig. 3 is a view taken from the direction of the arrow 3 Fig. 2, and showing my novel holder as swung to an inoperative position (the operative position of the same being indicated in dotted lines).

Referring to the details of that specific embodiment of my invention chosen for purposes of illustration, 1 may be a door or window, opening inwardly with reference to a jamb 2, and 3 may be a milk or cream bottle, such as is commonly employed in the delivery of the dairy products referred to during the night or in the early morning, and at a time when householders cannot advantageously be aroused to receive the same.

Coming now to the strictly novel features of my invention, in order adequately to cover the top of a milk bottle and to retain the same at a desired elevation in suitable proximity to a door or window, I consider it advantageous to employ retaining means such as a channel element 4; shown as provided with inwardly extending flanges adapted to engage the bead commonly provided at the outside of the top of a milk bottle neck; and in order to permit the channel element 4, or its equivalent, to swing into an unobstrusive, inoperative position, the said element may advantageously be rendered movable relatively to a jamb, as by providing a pivotal connection therewith. For the purposes referred to my preferred construction, herein shown, comprises a primary supporting plate 5, shown as secured to a jamb 2 by means of screws 5ª, the upper edge of plate 5 being shown as outwardly bent at 6 and recurved at 7 in a manner constituting the upper portion of said plate one element of a hinge, this hinge element being adapted to cooperate with an interfitting and correspondingly curved element 8, upon the inner edge of the channel element 4.

By the construction referred to, a pin 9, or its equivalent being interposed in such manner as to complete a pivotal connection between the plate 5 and the channel element 4, the cooperating recurved elements 7 and 8 may together constitute one of a pair of inwardly extending flanges F, F' adapted securely to retain a bottle of milk, or the like, by engaging the outwardly extending bead B at the top of the bottle neck, the insertion of a bottle in the manner disclosed in the figures being effective to retain the channel element 4, or its equivalent, in a substantially horizontal position, although the construction described is such as to permit the said channel element to swing, upon the removal of a bottle, into the inoperative position shown in Fig. 3.

In order to prevent the outward or unauthorized withdrawal of a bottle of milk, or the like, after its insertion into a channel element of the general character above described, I may employ any suitable means, my preferred means for the purpose referred to being simply a leaf spring 10 or equivalent resilient element, rigidly secured to the inner or lower surface of a channel element 4 or to an equivalent bottle covering means, as by means of rivets 11, the free inner end of the leaf spring 10 being curved downwardly to a sufficient extent to permit the engagement thereof with the inner surface of a bottle neck, or with the cap-receiving channel customarily provided therein.

A bottle holder of the general character described may be secured at any desired elevation upon a vertical or other surface; and it will be obvious that a channel element 4 of the character described may serve not only to retain a bottle in an elevated position but also to protect the top thereof; and when my novel bottle holder is to be utilized not only for the effects last mentioned but also to prevent the unauthorized withdrawal of a bottle of milk, my bottle holder may advantageously be placed so close to a door or window to whose jamb the plate 5 thereof may be permanently secured as to make the advancing of a milk bottle therefrom conditional upon the opening of said door or window. By the means described, a holder of my novel construction being preferably affixed in a position where it can be readily reached either from the inside or from the outside of a door or window (and preferably in a position sheltered from the direct rays of the sun), thereby adapting the same to receive a milk bottle at any hour convenient to the delivery thereof, the delivered milk, or the like, may be safely retained in a position convenient to its inward withdrawal, whenever the intended recipient shall open his door or window to receive the same.

Although I have herein described one complete and advantageous embodiment of my invention, it should be understood that various features thereof might be independently employed and also that various modifications might be made by those skilled in the art without involving the slightest departure from the spirit and scope of my invention as the same is indicated above and in the following claims.

What I claim is:

1. In a milk bottle holder, a channel element provided with inturned flanges adapted to engage a bead at the top of a bottle neck and with pivotal supporting means, one of said flanges being a part of a hinge.

2. A bottle holder comprising a support adapted to be mounted upon a jamb adjacent a closure, said support having an imperforate top provided with depending sides bent to form opposed inturned flanges, and a leaf spring secured upon the under side of said top and extending toward the closure as and for the purpose described, one of said flanges constituting a part of a hinge, whereby the holder may be pivotally mounted upon the jamb.

In testimony whereof I have signed my name to this specification.

JESS SWANEY.